W. G. FAY.
EYEGLASS MOUNT.
APPLICATION FILED FEB. 10, 1908.
907,764.
Patented Dec. 29, 1908.
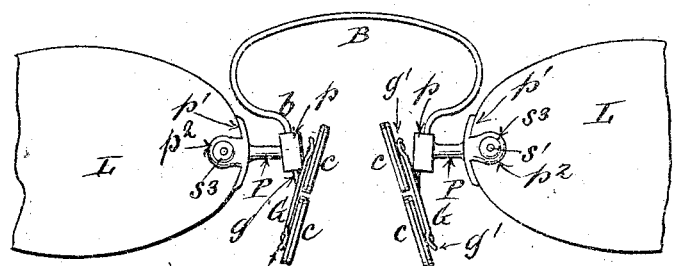
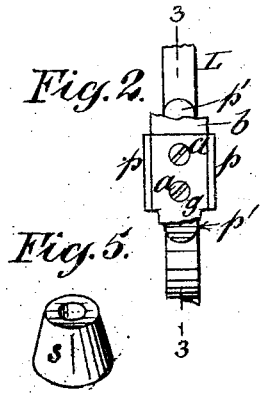
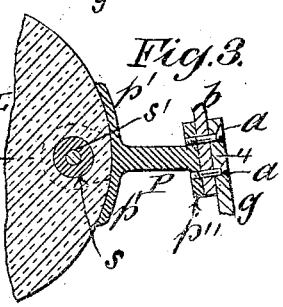
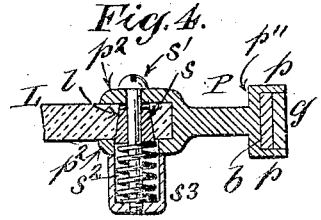

UNITED STATES PATENT OFFICE.

WALDO G. FAY, OF PELHAM, NEW YORK.

EYEGLASS-MOUNT.

No. 907,764.

Specification of Letters Patent.

Patented Dec. 29, 1908.

Application filed February 10, 1908. Serial No. 415,052.

*To all whom it may concern:*

Be it known that I, WALDO G. FAY, a citizen of the United States, residing in Pelham, Westchester county, and State of New York, have invented certain new and useful Improvements in Eyeglass-Mounts, of which the following is a specification.

My improvements relate to means for mounting, connecting and supporting eyeglasses, and are designed to attain greater accuracy in the assembling and attachment of parts, and at the same time to render the glasses more adaptable to the convenience and comfort of the user.

The invention consists in the specific construction and arrangement of parts hereinafter described and claimed.

In the accompanying drawings, Figure 1, is a rear view of the mount and adjacent portions of the eye-lenses; Fig. 2, a face view upon an enlarged scale of the end of one of the guard plate shanks and adjacent parts; Fig. 3, a section taken upon plane of line 3—3— Fig. 2; Fig. 4, a section taken upon plane of line 4—4— Fig. 3; Fig. 5, is an isometrical view of one of the lens bearings.

L, L, represent the eye-glasses, and B the ordinary bow spring by which they are united through the medium of the posts or studs P. The inner end of each post or stud is formed with the usual parallel flanges p, p, between which one end (b) of the bow spring rests as well as the shank g, of the guard plate G, on that side of the mount. As heretofore constructed the end b, of the bow spring B and the shank g, of the guard plate G have been secured in position between the flanges p, p, by a single central screw in line with the axis of the post, and said parallel flanges p, p, have been relied upon to counteract all tendency to lateral play or movement of the spring end b, and shank g, upon the screw as a pivot, but in practice, under the strain of actual and ontinuous use, these flanges p, p, soon yield more or less under the strain to which they are subjected by reason of the leverage exerted by the spring and shank with the single central screw as a fulcrum. As a result the joint between the parts soon becomes loose and wabbly greatly to the discomfort and inconvenience of the user and to the detriment of the mount as a whole. In some cases the screw even works out and is lost; and in any case, even though the screw be reset or retightened frequently the connection between the parts is not as positive and rigid as is desirable in a mount of this character in which considerable transverse strain is exerted upon the flanges p, p, of the post P during the ordinary adjustment and manipulation of the eye-glasses. I obviate this difficulty by the use of two relatively small screws a, a, passing through the shank g, of the guard plate and the end b, of the bow spring, and engaging with female screw threads in the post plate p'', on opposite sides of the axial line thereof, as will be understood by reference to Figs. 2 and 3,—the heads of the screws a, a, being countersunk within the shank g, of the guard plate so as to be flush with the face of said shank or substantially so. I preferably make these screws with conical heads and form conical recesses in the shank g, for their reception, so that the act of tightening the screws in position will tend to aline and wedge the parts in proper relation to each other. The countersinking of the screw heads affords a flush smooth surface for possible contact with the nose of the wearer, and avoids the accumulation of dirt around the heads of the screws.

It will thus be seen that the two screws a, a, acting in conjunction, counteract all tendency to lateral play or vibration, relieving the flanges p, p, of undue strain and wear, and preserving the integrity and rigidity of the joint as a whole, a result of great practical importance, since heretofore the loosening of the joint between spring, shank and post has been one main source of trouble in eye glasses of this class, and one frequently calling for repair or reproduction of parts.

The base or inner portion of each post P is formed with the usual strap p', for bearing against the rim of the lens L and with the side bearings $p^2$, $p^2$, overlapping the sides thereof. Heretofore the lens L has been secured to the post by a screw passing through a hole in one side bearing $p^2$, and through a perforation in the lens L, and engaging a female screw thread in the other side bearing of the post. This affords a rigid integral connection which, while most desirable at the inner end of the post as related to the spring bow and guard, is most objectionable at the outer end of the post when the brittleness of the lens is taken into account. In the first place the holes for the screw bolt must be formed with exceptional accuracy as related to each other and to the strap p', otherwise there will result either a looseness and play of the lens which has heretofore been taken up by bending the straps forward, or a tightness of contact between the strap and the edge of the lens which will be disastrous to the latter in the case of contraction by decrease of temperature. The bending of the ends of the strap toward the edge of the lens, which is usually done to afford a space between the central portion of the strap and the opposed edge of the lens to allow for contraction of the metal at low temperature without injury to the lens, makes an imperfect contact or bearing, so that during use the ends of the strap are bent back again, under which conditions the lens works loose and the screw falls out. Furthermore this rigidity of connection renders the lens subject to fracture by sudden jar, or undue lateral strain exerted against either the lens, or the post or both; and the inner surface of the strap $p'$, must not conform absolutely in curvature to that of the opposed edge of the lens, otherwise the rigid unyielding pressure exerted by the opposed surfaces in contact will obviously tend to crack the lens. I obviate these difficulties by connecting the lens to the post by means of a resilient clutch consisting preferably of a truncated conical wedge sleeve $s$, movable longitudinally upon the screw bolt $s'$, and held in engagement with the sides of the perforation $l$, in the lens L by means of a spring $s^2$, interposed between the wedge sleeve $s$, and the end of a cap nut $s^3$, with which the threaded end of the screw bolt $s'$, engages,—the outer edge of said cap nut $s^3$, resting against the side bearing $p^2$, of the post P upon that side of the lens, as will be seen by reference to Fig. 4. It is evident that the wedge sleeve $s$, may be other than conical in external form, but I prefer that shape for simplicity, and because it calls only for a plain conical bore $l$, in the lens L. It will be noted that the wedge sleeve $s$, does not enter entirely within the perforation in the lens, thus insuring a close contact of opposed conical surfaces.

The pressure of the spring $s^2$, against the wedge sleeve $s$, on the screw bolt $s'$, insures an intimate engagement and interlocking of the parts sufficient to sustain the lens firmly in position under ordinary conditions of use, while at the same time the resilience of the spring affords a degree of elasticity and flexibility sufficient to allow the parts to adapt themselves within prescribed limits to undue strain. The spring also allows and compensates for expansion and contraction of the parts under variations in temperature, and maintains a practically uniform pressure and contact thereof under all circumstances. Hence the glass is kept from working loose, being held in position and centralized by the wedge sleeve which in turn is supported and centralized by the screw bolt $s'$. The wedge also keeps the lens tight against the strap for its entire length, and as the strap is formed to fit the edge of the lens it cannot bend back and become loose.

What I claim as my invention and desire to secure by Letters Patent is,

1. In an eye-glass mount of the character designated, the combination with each lens post and perforated lens, of a screw bolt passing through a side bearing of the post and through the perforation in the lens, a wedge sleeve on said bolt projecting into the perforation in the lens, a cap nut on the end of the screw bolt, and a spring interposed between said cap nut and said wedge sleeve, for the purpose described.

2. In an eye-glass mount of the character designated, the combination with each lens post and perforated lens, of a screw bolt passing through the side bearings of the post and the perforation in the lens, a wedge sleeve on said bolt projecting into the perforation in the lens, a cap nut on the end of the screw bolt, and a spring interposed between said cap nut and said wedge sleeve, for the purpose described.

3. In an eye-glass mount of the character designated, the combination with each lens post of a lens formed with a conical perforation, a screw bolt passing through the side bearings of the post and the conical perforation in the lens, a truncated conical wedge sleeve on said bolt projecting into the conical perforation in the lens, a cap nut on the end of the screw bolt, and a spring interposed between said cap nut and said truncated conical wedge sleeve, for the purpose described.

WALDO G. FAY.

Witnesses:
D. W. GARDNER,
GEO. WM. MIATT.